(12) United States Patent
Kao et al.

(10) Patent No.: US 11,812,400 B2
(45) Date of Patent: Nov. 7, 2023

(54) METHOD AND SYSTEM FOR PREDICTING A STATE OF A CELL IN RADIO ACCESS NETWORK

(71) Applicant: Telefonaktiebolaget LM Ericsson (publ), Stockholm (SE)

(72) Inventors: Amos Kao, Overland Park, KS (US); Varun Juyal, Noida (IN); Barjinder Kochar, New Delhi (IN); David Fernandez, Málaga (ES); Ravi Kiran Kotty, Hyderabad (IN); Daniel Wilson, Jackson, NJ (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 484 days.

(21) Appl. No.: 17/279,376

(22) PCT Filed: Sep. 26, 2018

(86) PCT No.: PCT/EP2018/076073
§ 371 (c)(1),
(2) Date: Mar. 24, 2021

(87) PCT Pub. No.: WO2020/064094
PCT Pub. Date: Apr. 2, 2020

(65) Prior Publication Data
US 2021/0400758 A1 Dec. 23, 2021

(51) Int. Cl.
*H04W 4/00* (2018.01)
*H04W 60/04* (2009.01)
(Continued)

(52) U.S. Cl.
CPC ............ *H04W 60/04* (2013.01); *G06N 20/00* (2019.01); *H04W 36/08* (2013.01);
(Continued)

(58) Field of Classification Search
CPC . H04W 60/04; H04W 36/08; H04W 52/0206; H04W 74/0833; H04W 76/25;
(Continued)

(56) References Cited

U.S. PATENT DOCUMENTS

2003/0185162 A1* 10/2003 Fraser ............... H04W 52/0277
340/7.32
2014/0364127 A1 12/2014 Yin et al.
(Continued)

FOREIGN PATENT DOCUMENTS

WO 2018063201 A1 4/2018
WO WO-2020064094 A1 * 4/2020 ........ H04W 74/0833

OTHER PUBLICATIONS

International Search Report and Written Opinion dated May 29, 2019 for International Application No. PCT/EP2018/076073 filed Sep. 26, 2018, consisting of 9-pages.
(Continued)

*Primary Examiner* — Phuongchau Ba Nguyen
(74) *Attorney, Agent, or Firm* — Christopher & Weisberg, P.A.

(57) ABSTRACT

A method and system for predicting a state of a cell in a radio access network are described herein. The method includes obtaining information of the cell, determining one or more sets of conditions based on the information and predicting that the cell will enter a sleeping state when at least one set of the one or more sets of conditions is fulfilled. The method further includes outputting an action to prevent the cell from entering the sleeping state based on the probability and a number of wireless devices currently connected to the cell.

17 Claims, 3 Drawing Sheets

(51) Int. Cl.
   *H04W 36/08*   (2009.01)
   *H04W 52/02*   (2009.01)
   *H04W 76/25*   (2018.01)
   *G06N 20/00*   (2019.01)
   *H04W 74/08*   (2009.01)

(52) U.S. Cl.
   CPC ... *H04W 52/0206* (2013.01); *H04W 74/0833* (2013.01); *H04W 76/25* (2018.02)

(58) Field of Classification Search
   CPC ... H04W 28/04; H04W 72/04; H04W 72/042; H04W 88/08; H04W 28/08; H04W 28/084; H04W 36/22; H04W 72/12; G06N 20/00; Y02D 30/70; H04L 5/0007
   See application file for complete search history.

(56) References Cited

U.S. PATENT DOCUMENTS

2017/0041870 A1   2/2017   Chen et al.
2017/0208523 A1*  7/2017   Yang ................... H04W 76/28

OTHER PUBLICATIONS

Indian Examination Report dated Feb. 10, 2022 for Application No. 202147018718 consisting of 7 pages.

* cited by examiner

METHOD AND SYSTEM FOR PREDICTING A STATE OF A CELL IN RADIO ACCESS NETWORK

CROSS-REFERENCE TO RELATED APPLICATIONS

This application is a Submission Under 35 U.S.C. § 371 for U.S. National Stage Patent Application of International Application Number: PCT/EP2018/076073, filed Sep. 26, 2018 entitled "METHOD AND SYSTEM FOR PREDICTING A STATE OF A CELL IN RADIO ACCESS NETWORK," the entirety of which is incorporated herein by reference.

TECHNICAL FIELD

Embodiments herein relate to a system and a method therein. Furthermore, a computer program product and a computer readable storage medium are also provided herein. In particular, embodiments herein relate to predicting a state of a cell in a radio access network.

BACKGROUND

In a typical wireless communication network, wireless devices, also known as wireless communication devices, mobile stations, stations (STA) and/or user equipments (UE), communicate via a Radio Access Network (RAN) to one or more core networks (CNs). The RAN covers a geographical area which is divided into service areas or cells, with each service area or cell being served by a radio network node such as a radio access node e.g., a Wi-Fi access point or a radio base station (RBS), which in some networks may also be denoted, for example, a NodeB (NB), an enhanced NodeB (eNodeB), or a gNodeB (gNB). A service area or cell is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks, and investigate enhanced data rate and radio capacity. In some RANs, e.g., as in UTRAN, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g., eNodeBs in LTE, and the core network. As such, the RAN of an EPS has an essentially "flat" architecture comprising radio network nodes connected directly to one or more core networks, i.e., they are not connected to RNCs. To compensate for that, the E-UTRAN specification defines a direct interface between the radio network nodes, this interface being denoted the X2 interface. New generation radio (NR) is a new radio access technology being standardized in 3GPP.

A cell may be in different states, for instance, in a sleeping state. A sleeping cell is an unlocked cell that is transmitting on the broadcast channel which has no alarms and is unable to setup traffic, such as packets or voice calls.

The sleeping cell is a situation whereby a cell is considered as functioning by the operator, but from a wireless device perspective it is not working. It is difficult to detect when a cell switch to a sleeping state since there is no alarm associated with the switch. It could be caused by misconfiguration, excessive load, or software/firmware problems at a base station side. In case of sleeping cells, it is impossible for wireless devices to establish a connection or to make a handover to the sleeping cells. Sleeping cells are troublesome for operators as they lead to poor network performance, revenue loss and increased operating expenses (OPEX).

Sleeping cells are currently detected after 24 to 48 hours of their occurrence. During this time the originating call attempts performed by wireless devices camped on those cells fail. Although the action of getting cells back in operation is mostly confined to node restart or cell lock and unlock, it may take some time to detect that a cell has entered a sleeping state. Since the sleeping cells are detected after 24 or 48 hours the delay leads to unsatisfied customers which in turn leads to loss of revenue.

There is currently no method for predicting cells going to a sleeping state. A solution for predicting cells which will enter the sleeping state is needed.

SUMMARY

An object of embodiments herein is to provide a mechanism for improving performance of the wireless communication network. Particularly to provide a method and system for predicting a state of a cell in a RAN. Thereby it is possible to prevent the cell from entering the sleeping state.

According to an aspect the object is achieved by providing a method for predicting a state of a cell in a RAN. The method comprises obtaining information of the cell; determining one or more sets of conditions based on the information; and predicting that the cell will enter a sleeping state when at least one set of the one or more sets of conditions is fulfilled.

According to still another aspect the object is achieved by providing a system for predicting a state of a cell in a RAN. The system is configured to: obtain information of the cell; determine one or more sets of conditions based on the information; and predict that the cell will enter a sleeping state when at least one set of the one or more sets of conditions is fulfilled.

According to still another aspect the object is achieved by providing a system comprising processing circuitry configured to obtain information of a cell; determine one or more sets of conditions based on the information; and predict that the cell will enter a sleeping state when at least one set of the one or more sets of conditions is fulfilled.

It is furthermore provided herein a computer program product comprising instructions, which, when executed on at least one processor, cause the at least one processor to carry out any of the methods above, as performed by the system. It is additionally provided herein a computer-readable storage medium, having stored thereon a computer program product comprising instructions which, when executed on at least one processor, cause the at least one processor to carry out any of the methods above, as performed by the system.

Thanks to the embodiments herein, a prediction of the cell entering a sleeping state prior to it happening is provided. Thereby it is possible to prevent the cell from entering the sleeping state. Accordingly, various improvements on the performance of the wireless communication network, e.g., increased performance of cells and improved quality of service, will be achieved.

BRIEF DESCRIPTION OF THE DRAWINGS

Embodiments will now be described in more detail in relation to the enclosed drawings, in which.

DETAILED DESCRIPTION

Figure 1:
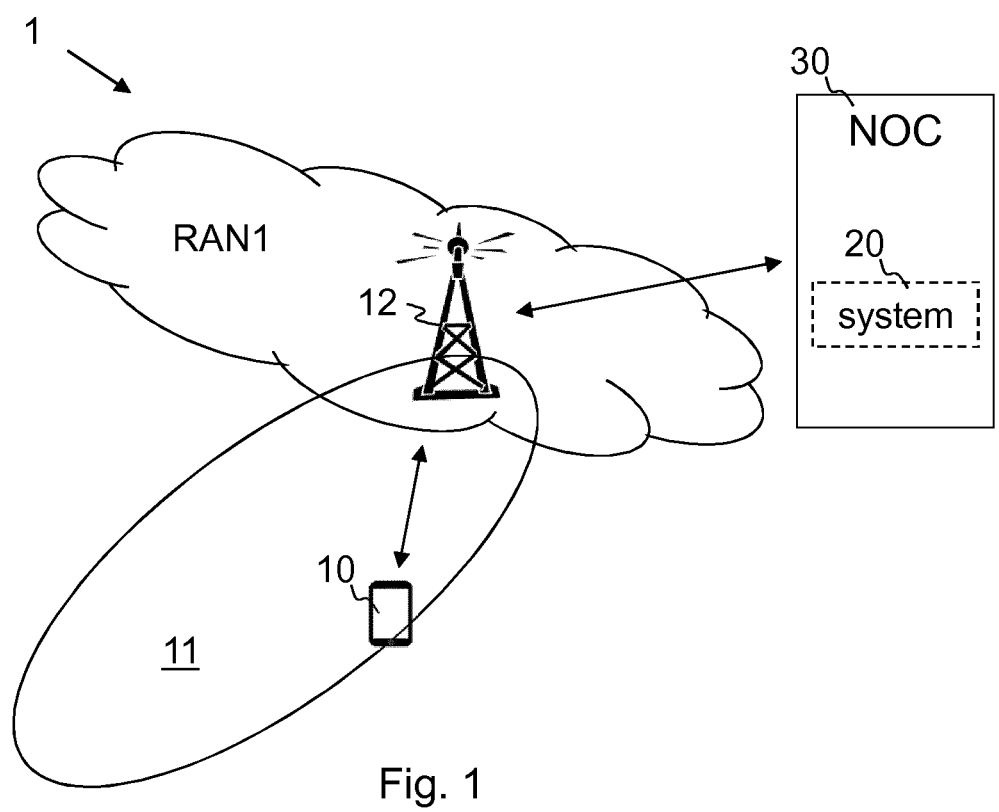
FIG. 1 is a schematic overview depicting a wireless communication network according to embodiments herein.

FIG. 1 is a schematic overview depicting a wireless communication network 1 comprising one or more RANs e.g., a first RAN (RAN1), connected to one or more CNs (not shown). The wireless communication network 1 may use one or more technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g., 3G and LTE.

In the wireless communication network 1, wireless devices e.g., a wireless device 10 such as a mobile station, a non-access point (non-AP) station (STA), a STA, a user equipment (UE) and/or a wireless terminal, are connected via the one or more RANs, to the one or more CNs, e.g., 5GCs. It should be understood by those skilled in the art that "wireless device" is a non-limiting term which means any terminal, wireless communication terminal, communication equipment, Machine Type Communication (MTC) device, Device to Device (D2D) terminal, or UE e.g., smart phone, laptop, mobile phone, sensor, relay, mobile tablets or any device communicating within a cell or service area.

The wireless communication network 1 comprises a radio network node 12. The radio network node 12 is exemplified herein as a RAN node providing radio coverage over a cell 11, i.e., a geographical area or a service area, of a radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g., a radio base station such as a NodeB, a gNodeB, an evolved Node B (eNB, eNodeB), a base transceiver station, Access Point Base Station, base station router, a transmission arrangement of a radio base station, a stand-alone access point or any other network unit capable of serving a wireless device 10 within the service area served by the radio network node 12 depending e.g., on the radio access technology and terminology used and may be denoted as a receiving radio network node.

The wireless communication network 1 also comprises a network operations center (NOC) 30 also known as a network management center. The NOC 30 is responsible for monitoring and controlling power failures, communication line alarms such as bit errors, framing errors, line coding errors, circuits down, and other performance issues that may affect the wireless communication network 1.

According to embodiments herein a system 20 for predicting that the cell 11 will enter the sleeping state will be introduced into the wireless communication network 1. The system 20 may be located either in the NOC 30 or in a cloud.

Figure 2:
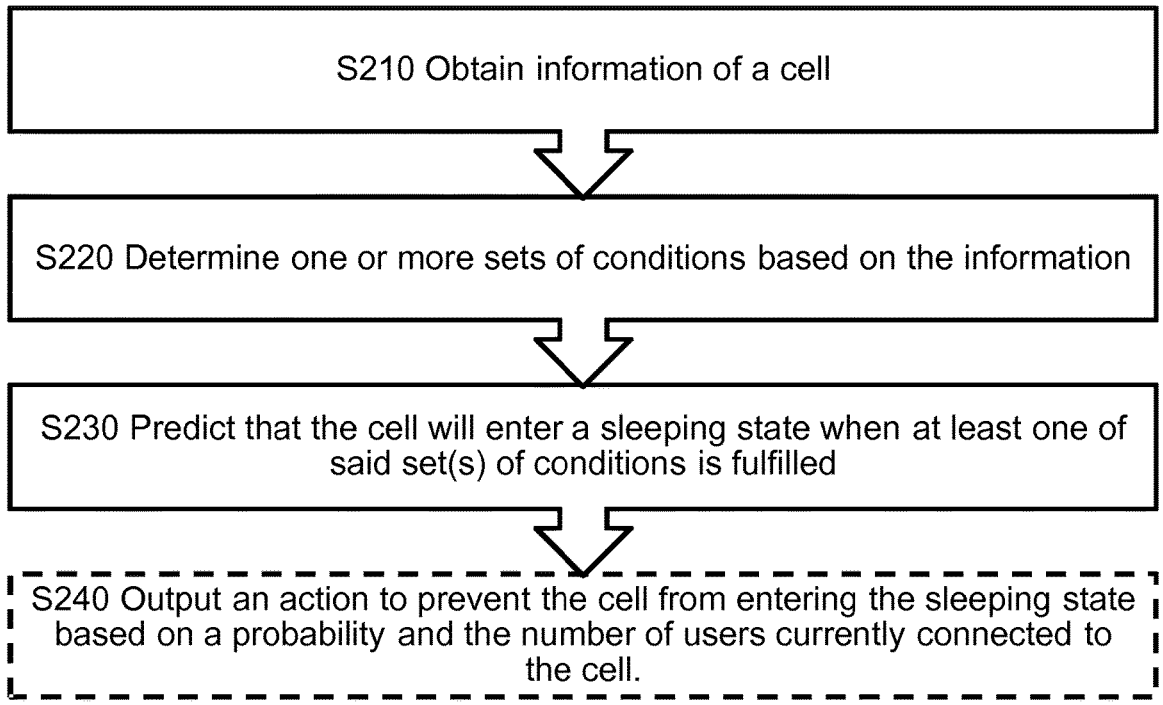
FIG. 2 is a flowchart depicting methods performed by a system according to embodiments herein.

The method actions performed by the system 20 for predicting a state of the cell 11 in the RAN 1 according to embodiments herein will now be described with reference to a flowchart depicted in FIG. 2. The actions do not have to be taken in the order stated below, but may be taken in any suitable order. Actions performed in some embodiments may be marked with dashed boxes.

Action S210. In order to predict an upcoming sleeping state, the system 20 first obtains information of the cell 11.

The information of a cell, e.g. cell 11, which may also be referred to as a profile of the cell 11, may comprise performance, configuration, and any other information of the cell 11. For instance, the information of a cell may comprise a Random Access Channel (RACH) success rate, how many Radio Resource Controller (RRC) connection requests, how many RRC connection failures, a RRC connection success rate, how many RRC connected wireless devices, how many RACH requests, how many RACH failures, an uplink (UL) throughput, a downlink (DL) throughput, and/or a DL acknowledgment failure rate. Additional information may also be comprised in the information of the cell, which will be discussed below.

The information of the cell may be of the current moment or of any previous period such as the last 24 hours, the last seven days, the last one month, etc.

Action S220. The system 20 determines one or more sets of conditions based on the information.

A set of conditions may comprise a plurality of conditions, e.g., rules, indicating a profile change of the cell 11, e.g., a performance change of the cell 11.

For instance, the set of conditions may indicate one or more of: a decrease of the RACH success rate, a decrease of the downlink throughput or a decrease of the RRC connection success rate.

Optionally, said set or sets of conditions may be dynamically determined by using a machine learning algorithm. The machine learning algorithm may be trained to learn what conditions have been fulfilled when a profile change of the cell 11 has happened, and thus the machine learning algorithm may determine the one or more sets of conditions.

Action S230. The system 20 predicts that the cell 11 will enter the sleeping state when at least one set of the one or more sets of conditions is fulfilled.

The sleeping cell 11 may be identified by a cell identity (ID) or any other identification information of a cell.

The system 20 may predict whether or not the cell 11 will enter the sleeping state. Additionally or alternatively, the system 20 may predict a probability that the cell 11 will enter the sleeping state. The probability defines a percentage of chance that the cell 11 will enter the sleeping state. The probability may increase with more conditions in one set being fulfilled. In other words, the more conditions in one set that are fulfilled, the higher probability that the cell 11 will enter the sleeping state. For instance, if all conditions in one set are fulfilled the probability may be 100%, if only partial conditions in one set are fulfilled the probability may be less than 100%, e.g., 70%. The skilled person will appreciate that the embodiments herein are not limited to any specific probability value, it can be a design option.

Action S240. The system 20 may output a recommended action to prevent the cell 11 from entering the sleeping state based on the probability and the number of wireless devices currently connected to the cell 11.

Actions to prevent the cell 11 from entering the sleeping state may comprise a soft reset, a hard reset (also referred to as a node reset) or a locking of the cell 11. Which one of the above actions to take may depend on the probability and the number of wireless devices currently connected to the cell. This can be a design option.

The number of wireless devices currently connected to the cell 11 may determine how much impact the switching into the sleeping state will have, as the number increases the severity of the impact increase. The impact may have different levels. As an example, the impact may comprise three levels with reference to an average number of connected wireless devices on the site. The impact may be: a critical level when the number of connected wireless devices on the cell 11 is higher than an average number; a major level when the number of connected wireless devices on the cell 11 is equal to or less than the average number; and an informative level when the number of connected wireless device on the cell 11 is close to zero.

The recommended action may be performed at times when there is low traffic, i.e., when a small or minimum number of wireless devices are connected on the cell 11.

Embodiments herein enable a prediction of the cell 11 entering the sleeping state prior to it happening. Thereby it is possible to prevent the cell 11 from entering the sleeping state by performing any of the action mentioned above. Accordingly, various improvements on the performance of the wireless communication network, e.g., increased performance of cells, improved quality of service etc., will be achieved.

The system 20 may be implemented by either a conventional signal processing technique or the machine learning (ML) algorithm. A technical advantage of the ML algorithm is that it can take into account large number of variables and complex relationships among them, Moreover, the ML algorithm may adapt, e.g., the set or sets of conditions, the thresholds and/or time periods etc. over time.

Figure 3:
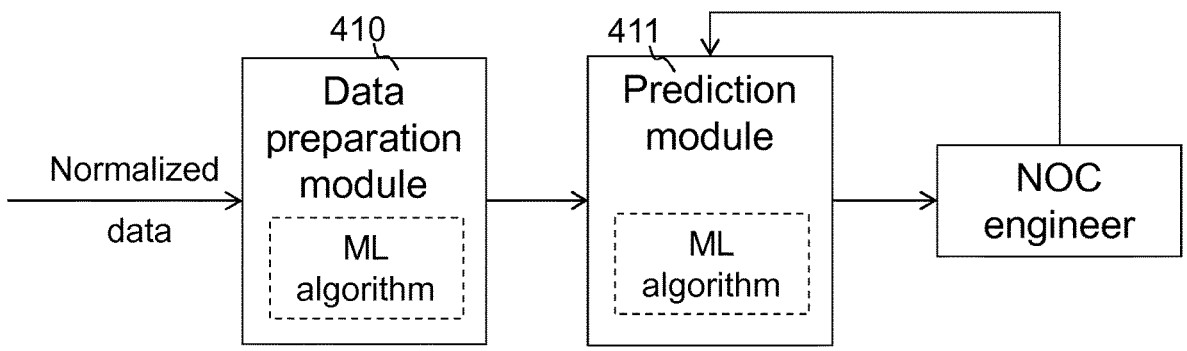
FIG. 3 is a schematic overview depicting a system according to embodiments herein.

The system 20 implemented by the ML algorithm for predicting a state of the cell 11 in the RAN 1 according to embodiments will now be described with reference to a flowchart depicted in FIG. 3.

A ML algorithm in a data preparation module 410 will obtain information of the cell 11 as an input. The information of the cell 11 may be normalized data, which may comprise a performance measurement (PM), a configuration management (CM), and/or a measurement by a wireless device. The data preparation module 410 may clean up the normalized data, for example, by removing outliers. As shown in Table 1 below, possible information of the cell 11 can be obtained from different data sources.

TABLE 1

| Data Sources | Information of a Cell |
| --- | --- |
| PM counters | RACH success rate, the number of RRC connection requests, the number of RRC connection failures, RRC connection success rate, the number of RRC connected wireless devices, the number of RACH requests, the number of RACH failures, uplink (UL) throughput, downlink (DL) throughput, DL acknowledgment failure rate |
| CM counters | Cell location |
| Wireless device measurements | Reference signal received power (RSRP), reference signal received quality (RSRQ) |
| Weather | Weather |
| Alarms | Cell availability |

As mentioned above, the information of the cell 11 may comprise various different types of information associated with the cell 11. The ML algorithm, e.g., XGBoost, in the data preparation module 410 will select the information which have more influence on getting the cell 11 to go to the sleeping state. For instance, the selected information may be the RACH success rate. Then the ML algorithm, e.g., XGBoost, will generate complex information to be used for the prediction. The complexed information may be generated by complexing key performance indicator (KPI) values of the selected information in a time period, e.g., in the last one week. The time period may be configurable. The complexing may be performed by using a moving average (MA). For example, the complexed information for RACH success rate is the MA of RACH success rate for one week. That is to say, the output from the data preparation module 410 may be the complexed information of the cell 11.

Then a prediction module 411, e.g. by using a ML algorithm such as a decision tree, may determine the one or more sets of conditions associated with the complexed information. Since the information of the cell 11 is changing dynamically over time, the determination may also be dynamic over time. By using the information of the cell 11, the ML algorithm may train the set or sets of conditions, the thresholds and/or time periods over time.

For instance, one set of the conditions may comprise one or more conditions associated with the RACH success rate specifying a decrease of the RACH success rate. The one or more conditions may specify the decrease of the RACH success rate by comparing the RACH success rates of different periods, e.g., a MA of the RACH success rate for the last seven days is higher than the MA of the RACH success rate for last 24 hours. Alternatively, the one or more conditions may specify the increase by using different thresholds, e.g., the MA of the RACH success rate in the last seven days is above a threshold, and the MA of the RACH success rate in the last 24 hours is lower than a threshold which threshold may be either the same or a different threshold from the previous threshold.

Similarly, another set of the conditions may comprise one or more conditions associated with the RACH success rate specifying a decrease of the DL throughput. Another set of the conditions may comprise one or more conditions associated with the RACH success rate specifying the decrease of the RRC connection success rate. Alternatively, another set of the conditions may comprise any combination of the above one or more conditions.

Furthermore, in order to get a more precise prediction, the set of the conditions may additionally be associated with other information of the cell 11. For instance, the MA of the average number of RRC connected wireless devices for the last 24 is above a threshold, and/or a current DL acknowledgment failure rate is above a threshold.

Some exemplary sets of conditions are provided herein.
Set #1 of conditions comprises:
condition 1: a MA of the RACH success rate in the last seven days is above a threshold,
condition 2: a MA of the RACH success rate in the last 24 hours is lower than a threshold,
condition 3 (optional): a MA of an average number of RRC connected wireless devices in the last 24 is above a threshold, and
condition 4 (optional): a current DL acknowledgment failure rate is above a threshold.
Set #2 of conditions comprises:
condition 1: a MA of the DL throughput in the last 24 hours is above a threshold,
condition 2: a MA of a current DL throughput is lower than a threshold,
condition 3 (optional): a MA of the RRC connection success rate in the last seven days is above a threshold,
condition 4 (optional): a MA of the RRC connection success rate in the last 24 hours is above a threshold, and
condition 5 (optional): a MA of a current RRC connection success rate is lower than a threshold,
Set #3 of conditions comprises:
condition 1 (optional): a MA of the RRC connection success rate in the last seven days is above a threshold,
condition 2: a MA of the RRC connection success rate in the last 24 hours is above a threshold,
condition 3: a MA of a current RRC connection success rate is lower than a threshold,
condition 4 (optional): a DL acknowledgment failure rate in the last 24 hours is above a threshold, and
condition 5 (optional): a MA of a current RACH success rate is below a threshold For ease of reading, embodiments herein are described in the context of a time period such as a current moment, the last 24 hours, the last seven days or the last one month. However the skilled person will appreciate that the embodiments herein also applies to other time references. Similarly, the embodiments herein are applicable to any type of MA such as an exponentially weighted moving average (EWMA).

Next step, the prediction module 411 may use the set or sets of conditions to predict whether or not the cell 11 will enter the sleeping state. If e.g. all conditions in one set are fulfilled, then the cell 11 will be predicted to enter the sleeping state. Alternatively, the prediction module 411 may predict the probability that the cell 11 will enter the sleeping state as mentioned above.

In case that the cell 11 has been predicted to enter the sleeping state, the prediction module 411 may output recommended action or actions, in order to enable a NOC engineer to prevent the cell 11 from entering the sleeping state. As shown in Table 2, possible actions may be recommended depending on the probability and the number of wireless devices currently connected to the cell 11.

TABLE 2

| Action | Impact | Probability | The Number of times in row a cell has been predicted to enter the sleeping state |
|---|---|---|---|
| Node reset during maintenance window | Critical | 80% or more | 1 |
| Soft reset if maintenance window not available | Critical | 80% or more | 1 |
| No action | Critical | Less than 80% | 1 |
| Node reset during maintenance window | Major | 80% or more | 2 |
| No action | Major | Less than 80% | 1 |
| Node Reset | Minor | 80% or more | 2 |
| No action | Minor | Less than 80% | 1 |

The recommended action may involve a complete stoppage of service, which may make the situation worse after taking the action. Ideally the action may be taken during low traffic period which means that the minimum number of users will be impacted when the action is taken. Sometimes, manual intervention by the NOC engineer would be necessary if the NOC engineer believes that there is no low traffic time available and if the action is not taken then it will have adverse effects.

In order to assist the NOC engineer to take any necessary control action, the prediction module 411 may output the following information to the NOC engineer:
predicted sleeping cell, which may be indicated by a cell 11 ID;
probability (optional), which indicates the percentage that a cell will enter the sleeping state;
impact or severity of impact (optional), which is associated with the number of connected wireless device on the cell, the higher the number the more severe the impact. The impact may comprise different levels. As an example, the impact may comprise three levels with reference to an average number of connected wireless devices to the cell 11. The impact may be at a critical level when the number of connected wireless devices on the cell 11 is higher than the average number. The impact may be at a major level when the number of connected wireless devices on the cell 11 is equal to or less than the average number. The impact may be at a minor level when the number of connected wireless devices on the cell 11 is close to zero;
set or sets of conditions has/have been fulfilled (optional), to tell the NOC engineer what the cause leading to the sleeping state is; and
recommended action(s) (optional)

The NOC engineer may provide feedback whether or not the cell 11 predicted to go to sleep actually went to sleep. If the feedback is negative, the ML algorithm in the data preparation module 410 will be retrained in order to improve the result.

By virtue of the embodiment herein, a prediction of the cell entering the sleeping state prior to it happening has been enabled. Thereby it is possible to prevent the cell from entering the sleeping state. Accordingly, various improvements on the performance of the wireless communication network, e.g., increased performance of cells, improved quality of service etc., will be achieved.

Figure 4:
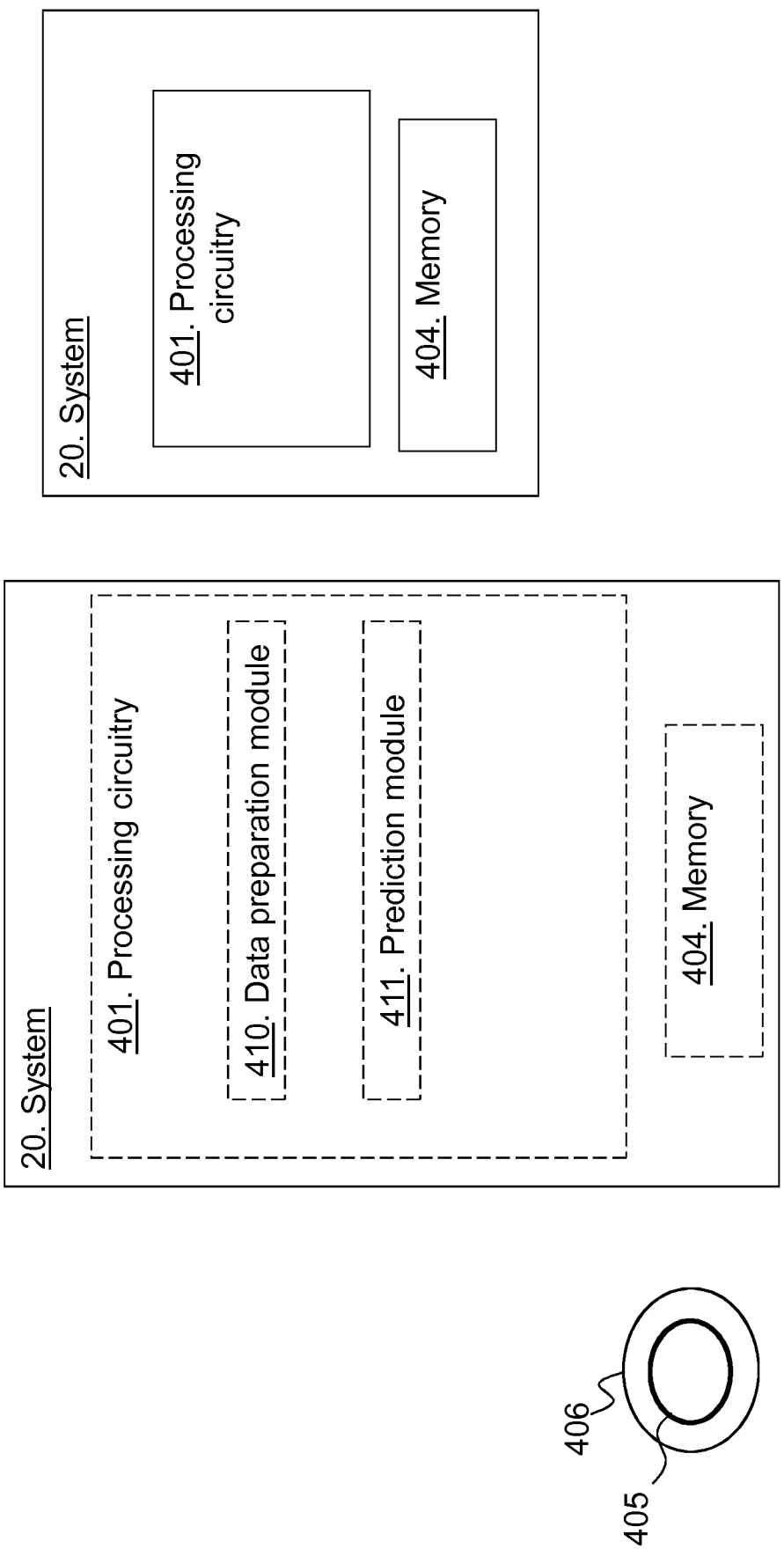
FIG. 4 is a block diagram depicting a system according to embodiments herein.

FIG. 4 is a block diagram depicting the system 20 for predicting the state of the cell 11 in the RAN according to embodiments herein. The system 20 may be located either in the NOC 30 or in a cloud. Different modules of the system 20 may also be located in different locations in a cloud.

The system 20 may comprise processing circuitry 401, e.g., one or more processors, configured to perform the methods herein.

The system 20 may comprise the data preparation module 410. The system 20, the processing circuitry 401, and/or the data preparation module 410 are configured to obtain information of the cell 11.

The system 20 may comprise the prediction module 411. The system 20, the processing circuitry 401, and/or the prediction module 411 are configured to determine one or more sets of conditions based on the information, and predict that the cell 11 will enter the sleeping state when at least one set of the one or more sets of conditions is fulfilled.

The system 20, the processing circuitry 401, and/or the prediction module 411 may also be configured to output an action to prevent the cell 11 from entering the sleeping state based on the probability and the number of wireless devices currently connected to the cell 11.

The system 20 may further comprise a memory 404. The memory comprises one or more units to be used to store data on, such as the inputs, outputs, thresholds, time period and/or the related parameters to perform the methods disclosed herein when being executed. Thus, the system 20 may comprise the processing circuitry 401 and the memory 404, said memory 404 comprising instructions executable by said processing circuitry 401 whereby said system 20 is operative to perform the methods herein.

The methods according to the embodiments described herein for the system 20 are respectively implemented by means of e.g., a computer program product 405 or a computer program 405, comprising instructions, i.e., software code portions, which, when executed on at least one processor, cause the at least one processor to carry out the actions described herein, as performed by the system 20. The computer program product 405 may be stored on a computer-readable storage medium 406, e.g., a disc, USB or similar. The computer-readable storage medium 406, having stored thereon the computer program product 405, may comprise the instructions which, when executed on at least one processor, cause the at least one processor to carry out the actions described herein, as performed by the system 20. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio base station, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio base stations will appreciate the cost, performance, and maintenance trade-offs inherent in these design choices.

The invention claimed is:

1. A method for predicting a state of a cell in a radio access network, RAN, the method comprising:
obtaining information of the cell;
determining one or more sets of conditions based on the obtained information, at least one of the one or more sets of conditions indicating a decrease of a Random Access Channel, RACH, success rate;
predicting that the cell will enter a sleeping state when at least one set of the one or more sets of conditions is fulfilled; and
outputting an action to prevent the cell from entering the sleeping state based on a probability and a number of wireless devices currently connected to the cell.

2. The method according to claim 1, further comprising dynamically determining the one or more sets of conditions by using a machine learning algorithm.

3. The method according to claim 2, wherein at least one of the one or more sets of conditions indicates a decrease of a Random Access Channel, RACH, success rate.

4. The method according to claim 2, wherein at least one of the one or more sets of conditions indicates a decrease of a DL throughput.

5. The method according to claim 2, wherein at least one of the one or more sets of conditions indicates a decrease of Radio Resource Controller, RRC, connection success rate.

6. The method according to claim 2, wherein predicting that the cell will enter the sleeping state comprises predicting the probability that the cell will enter the sleeping state, wherein the probability that the cell will enter the sleeping state increases with more conditions in one set being fulfilled.

7. The method according to claim 1, wherein at least one of the one or more sets of conditions indicates a decrease of a DL throughput.

8. The method according to claim 1, wherein at least one of the one or more sets of conditions indicates a decrease of Radio Resource Controller, RRC, connection success rate.

9. The method according to claim 1, wherein predicting that the cell will enter the sleeping state comprises predicting the probability that the cell will enter the sleeping state, wherein the probability that the cell will enter the sleeping state increases with more conditions in one set being fulfilled.

10. A system for predicting a state of a cell in a radio access network, RAN, the system configured to:
obtain information of the cell;
determine one or more sets of conditions based on the information, at least one of the one or more sets of conditions indicating a decrease of a Random Access Channel, RACH, success rate;
predict that the cell will enter a sleeping state when at least one of the one or more sets of conditions is fulfilled; and
output an action to prevent the cell from entering the sleeping state based on a probability and a number of wireless devices currently connected to the cell.

11. The system according to claim 10, further configured to dynamically determine the one or more sets of conditions by using a machine learning algorithm.

12. The system according to claim 10, wherein at least one of the one or more sets of conditions further indicates a decrease of a downlink throughput.

13. The system according to claim 10, wherein at least one of the one or more sets of conditions indicates a decrease of Radio Resource Controller, RRC, connection success rate.

14. The system according to claim 10, further configured to predict the probability that the cell will enter the sleeping state, wherein the probability that the cell will enter the sleeping state increases with more conditions in one set being fulfilled.

15. The system according to claim 14, further configured to output an action to prevent the cell from entering the sleeping state based on the probability and a number of wireless devices currently connected to the cell.

16. A system comprising processing circuitry configured to:
   obtain information of the cell;
   determine one or more sets of conditions based on the information, at least one of the one or more sets of conditions indicating a decrease of a Random Access Channel, RACH, success rate;
   predict that the cell will enter a sleeping state when at least one of the one or more sets of conditions is fulfilled; and
   output an action to prevent the cell from entering the sleeping state based on a probability and a number of wireless devices currently connected to the cell.

17. A non-transitory computer-readable storage medium, having stored thereon a computer program comprising instructions which, when executed on at least one processor, cause the at least one processor to carry out a method for predicting a state of a cell in a radio access network, RAN, the method comprising:
   obtaining information of the cell;
   determining one or more sets of conditions based on the obtained information, at least one of the one or more sets of conditions indicating a decrease of a Random Access Channel, RACH, success rate;
   predicting that the cell will enter a sleeping state when at least one set of the one or more sets of conditions is fulfilled; and
   outputting an action to prevent the cell from entering the sleeping state based on a probability and a number of wireless devices currently connected to the cell.

* * * * *